Nov. 4, 1924.
J. G. VINCENT
HYDROCARBON MOTOR
Original Filed May 1, 1918
1,513,946
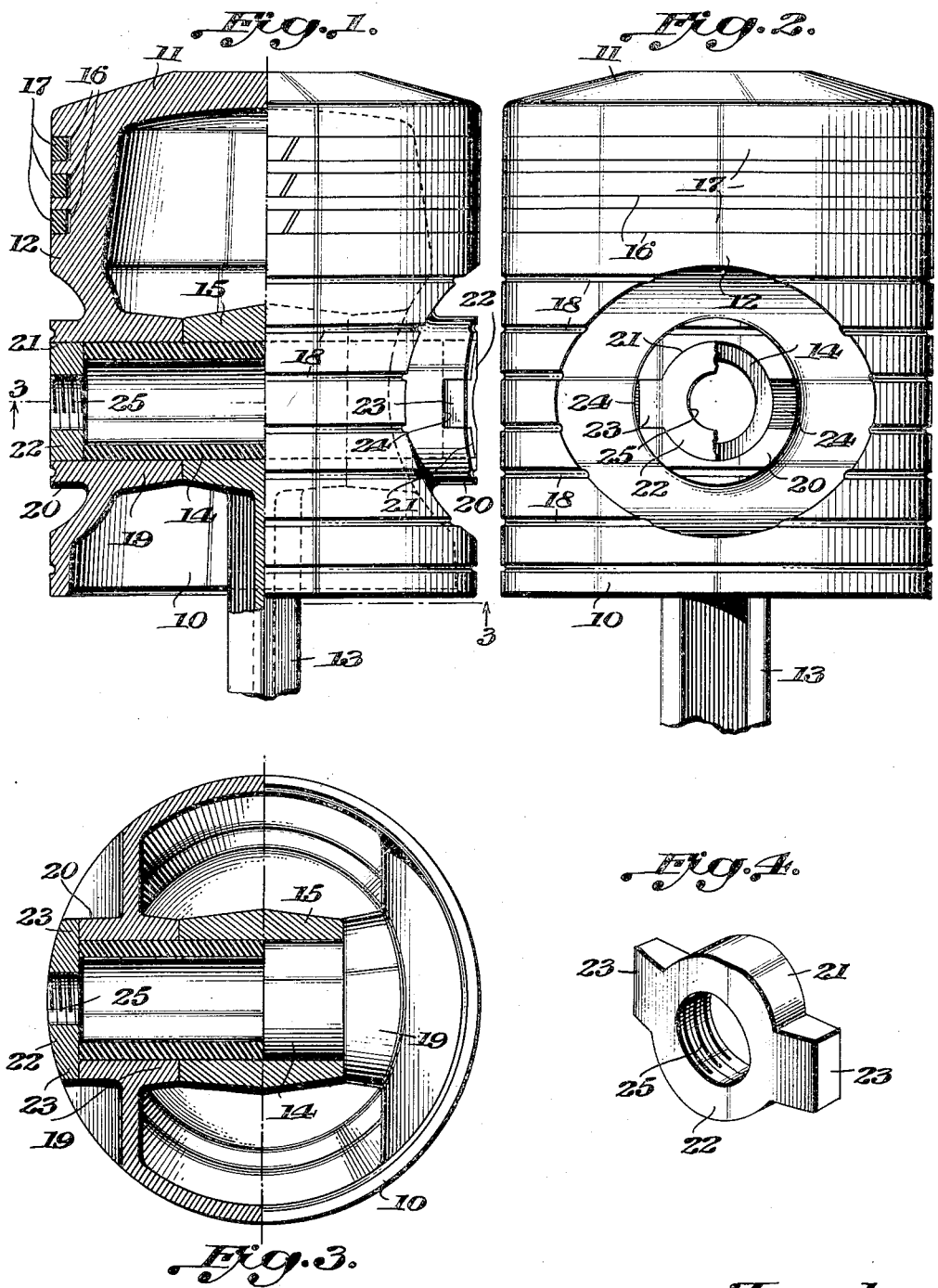

Patented Nov. 4, 1924.

1,513,946

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed May 1, 1918, Serial No. 231,848. Renewed December 22, 1923.

*To all whom it may concern:*

Be it known that I, JESSE G. VINCENT, a citizen of the United States, and resident of Detroit, Wayne County, State of Michigan, have invented certain new and useful Improvements in Hydrocarbon Motors, of which the following is a specification.

This invention relates to hydrocarbon motors and particularly to the piston construction thereof.

One of the objects of the present invention is to provide a piston with novel means for retaining the piston pin therein.

Another object of the invention is to provide a piston with plugs in the ends of the pin bosses adapted to retain the pins therein.

Another object of the invention is to provide a piston with a depressed portion around the outer parts of the piston pin bosses and with plugs in the ends of the bosses, said plugs having lugs co-operating with the bosses to prevent turning of the plugs therein.

Another object of the invention is to provide a piston with piston pin retaining means not liable to loosen or drop out while the piston is in place in the cylinder.

Other objects of the invention will appear from the following description taken in connection with the drawings which form a part of this specification, and in which:

Fig. 1 is a longitudinal sectional view on the left side and an elevation view on the right side, showing a piston made in accordance with this invention:

Fig. 2 is an elevation of the piston shown in Fig. 1, with part of the pin retaining means broken away;

Fig. 3 is a view on the line 3—3 of Fig. 1, looking upwardly, part of this view being in section; and Fig. 4 is a perspective view of the piston pin retaining device.

Referring to the drawings, 10 indicates the piston generally, and 11 is the head portion and 12 the skirt portion thereof. The piston is shown in its assembled relation with a connecting rod 13, being pivotally connected thereto as by a piston pin 14 which passes through the upper end 15 of said connecting rod.

Just below its head, the piston is formed with peripheral annular grooves 16 in which are piston rings 17 of usual construction. Below these piston rings the piston skirt is formed with a series of small annular grooves 18, suitably spaced apart as shown in the drawings, these grooves being for the purpose of facilitating the distribution of oil to the piston and cylinder walls.

In the skirt portion 12 of the piston are two oppositely disposed bosses 19 between which is the head 15 of the connecting rod and into which the piston pin 14 extends and has its bearing. Around the outer ends 20 of these bosses 19 the piston skirt is depressed somewhat, these depressions being shown as of somewhat semi-cylindrical form as will be seen particularly in Figs. 1 and 2, thus leaving spaces all around the outer ends of said bosses. This depression of the piston skirt brings the connection between the skirt and the bosses to points on the bosses substantially midway between their ends, thus adding considerable strength to the piston structure. Thus the pressure on the piston head, when the piston is in operation in a motor cylinder, is transferred directly through the skirt of the piston to the bosses and to the piston pin directly beneath the points where the skirt joins the bosses. This construction is particularly advantageous where the piston pin does not extend all the way to the outer ends of the bosses as herein shown.

At the outer end 20 of each of the piston pin bosses 19 is a means or device for retaining the piston pin in the piston. One of these devices is shown at 21 in Fig. 4 and it comprises a body or plug portion 22 of cylindrical form and adapted to closely fit the interior of the outer end 20 of the piston boss 19. The device also has a lug 23 adapted to enter a transverse slot 24 in the outer end 20 of the piston boss. As shown, there are two of these lugs 23 and there are likewise two such slots 24 in the boss, these lugs and slots being arranged transversely of the piston and the fit between the sides of the lugs and the corresponding sides of the slots is made very snug to prevent any possible slapping of the device in the end of the piston boss.

The outer faces of the ends 20 of the piston bosses and the outer surface of the device 21 are preferably made to conform with the cylindrical periphery of the piston so that these surfaces will readily contact with the cylinder wall in which the piston operates.

It will be understood that in assembling the parts the end 15 of the connecting rod 13 is arranged between the inner ends of the bosses 19 of the piston, the piston pin 14 is then inserted through one of the bosses and the connecting rod into the other boss until the pin is in the position shown in Fig. 1 with its ends somewhat inwardly of the outer ends 20 of the bosses, and the devices or plugs 21 are then fitted into the outer ends 20 of the piston bosses with the lugs 23 in the slots 24. The piston pin 14 is of such length that there is only slight play for the pin between the plugs 21 with the latter in contact with the cylinder walls and by reason of the rather large outer surface of the plugs 21 the latter may slide in the cylinder without injury to it.

The plug or device 21 shown may be formed with a central opening 25 tapped as shown to permit of the insertion of a tool therein to facilitate removing the plug.

It will be further understood that other forms and modifications of the devices shown and described herein may be made without departing from the spirit or scope of the invention.

Having thus described my invention, what I claim and desire to secure by Letters Patent is:

1. A piston having pin bosses, and pin retaining plugs independently mounted in the piston bosses at the ends thereof, said plugs being slidable longitudinally of the bosses into and out of retaining positions without distortion of plug or piston.

2. The combination with a piston having bosses in the skirt portion, said bosses having slots in their outer ends, of a piston pin in said bosses, and pin retaining plugs mounted in the outer ends of said bosses free from mechanical connection with the pin and having lugs in said slots.

3. A piston having bosses in the skirt portion, said bosses having slots in their outer ends, and pin retaining means in the outer ends of said bosses, said means having outer surfaces conforming to the cylindrical form of the periphery of the piston and said means having lugs in said slots.

4. A piston having pin bosses and plugs slidable in the ends of said bosses to retain the pin therein, said plugs having their outer surfaces corresponding to the cylindrical periphery of the piston so that the plug may bear against the cylinder and thereby be retained in place.

5. The combination with a piston, a connecting rod, and a pin connecting the piston and rod and insertable through the piston, of a plug mounted in the piston at each end of the pin to retain the latter in place, said plugs being unconnected and slidable longitudinally of the pin into and out of retaining positions without distortion of plug or piston, and tool engaging means on one of the plugs to facilitate removal thereof.

6. The combination with a piston and a connecting rod, of a pin extending through said rod and into the piston at both sides thereof, and plugs slidably mounted in the piston at the ends of said pin, said plugs having lugs to prevent their turning in the piston.

7. The combination with a piston and a connecting rod, of a pin extending through said rod and into the piston at both sides thereof, and plugs slidably mounted in the piston at the ends of said pin and having an outer cylindrical surface conforming to the piston surface.

8. A piston having head and skirt portions, piston pin bosses in the skirt portion, said skirt portion being depressed inwardly around said bosses, and unconnected plugs in the outer ends of said bosses to retain the piston pin therein, said plugs being slidable in the bosses without distortion of either plug or piston.

9. The combination with a piston and a pin therein, of pin retaining plugs independently mounted in the piston at the ends of the pin, said plugs being slidable in the piston longitudinally of the pin without distortion of plug or piston.

10. The combination with a piston and a connecting rod, of a pin connecting the piston and rod, and pin retaining plugs slidably mounted in the piston and each having a relatively large cylinder contact surface at its outer end conforming to the piston surface.

11. A piston having head and skirt portions, piston pin bosses in the skirt portion, said skirt portion being depressed inwardly around said bosses and said bosses having slots in their outer ends, and plugs in the outer ends of said bosses and having lugs in said slots.

12. A piston having bosses in the skirt portion, said bosses having slots in their outer ends, and snugly fitting plugs in the outer ends of said bosses and having lugs in said slots.

13. A piston having bosses in the skirt portion, said bosses having slots in their outer ends, and pin retaining means having a snug fit in said bosses and having lugs in said slots.

14. A piston having bosses in the skirt portion, said bosses having slots in their outer ends running transversely of the piston, and plugs insertable with a snug fit in the outer ends of the bosses and having lugs to enter said slots.

15. A piston having bosses in the skirt portion, said bosses having slots in their outer ends running transversely of the piston, and plugs insertable in the outer ends of the bosses and having lugs to enter said slots, the outer surfaces of said plugs and their lugs conforming to the cylindrical form of the periphery of the piston.

16. The combination with a piston having piston pin bosses and having the skirt connected to said bosses somewhat inwardly from the outer ends of said bosses, of a piston pin arranged within said bosses and terminating therein approximately in line with the outer points of attachment of the piston skirt to the bosses, and means for retaining the pin in said bosses.

17. The combination with a piston having piston pin bosses and having the skirt connected to said bosses somewhat inwardly from the outer ends of said bosses, of a piston pin arranged within said bosses and terminating therein approximately in line with the outer points of attachment of the piston skirt to the bosses, and means within the bosses and beyond the ends of the pin for retaining the latter in place.

18. The combination with a piston having piston pin bosses and having the skirt connected to said bosses somewhat inwardly from the outer ends of said bosses, of a piston pin arranged within said bosses and terminating therein approximately in line with the outer points of attachment of the piston skirt to the bosses, and plugs in the outer ends of said bosses to retain the pin therein.

19. The combination with a piston having bosses in the skirt portion, said bosses having transverse slots at their outer ends, of a piston pin in said bosses, and pin retaining means having a part the outer surface of which conforms to the cylindrical form of the periphery of the piston and parts extending into said slots.

20. The combination with a piston and its pin of a retainer for the pin comprising a cylindrical plug to enter the opening for the pin and having wings to enter recesses in the piston to prevent rotation of the plug, said plug being adapted to contact with the cylinder wall.

21. A piston pin retainer comprising a plug having a substantially flat inner face and an arcuate outer face and laterally extending projections to prevent turning of the plug in its seat.

In testimony whereof I affix my signature.

JESSE G. VINCENT.